S. Page,
Hay Fork.
No. 79,384.
Patented June. 30. 1868.
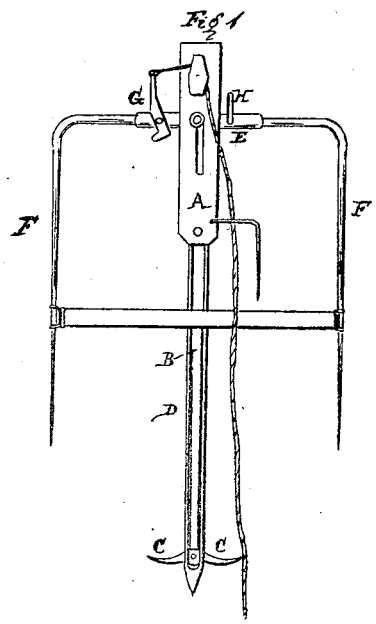
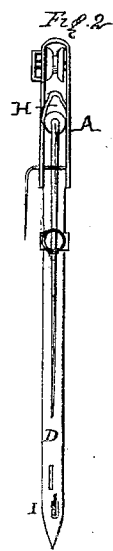
Witnesses
Wm Vanilebin
Leopold Everts
Inventor
Samuel Page
per
Alexander Mason
Atty

United States Patent Office.

SAMUEL PAGE, OF McALISTERVILLE, PENNSYLVANIA.

Letters Patent No. 79,384, dated June 30, 1868.

IMPROVEMENT IN HORSE HAY-FORKS.

The Schedule referred to in these Letters Patent and making part of the same.

TO ALL WHOM IT MAY CONCERN:

Be it known that I, SAMUEL PAGE, of McAlisterville, in the county of Juniata, and in the State of Pennsylvania, have invented certain new and useful Improvements in Hay-Forks; and do hereby declare that the following is a full, clear, and exact description thereof, reference being made to the accompanying drawings, and to the letters of reference marked thereon.

In the annexed drawings, making part of this specification—
Figure 1 represents a side view, and
Figure 2 an edge view of my fork.

In the drawings, A represents a metallic clip, to the lower end of which is secured a metallic bar, B. To the lower end of the bar B are pivoted, at one end, two curved teeth, c c. D represents a tine, to the upper end of which is secured a cross-bar, E. This cross-bar is embraced between the two parts of the clip A, and a pivot or pin, secured to the cross-bar, projects through slots in each part of the clip, as seen in fig. 1. The tine D is hollow, and the bar B passes down through it. From each end of the bar E project the angular tines F F. These tines, being screwed into the bar E, are removable at will. On the front of the bar E is a crooked L-shaped lever, G, which is pivoted, and which is provided with a rope at its upper end, said rope being passed over a pulley on the clip, and extending down to the operator. By drawing on this rope, the clip A is shifted laterally on the bar E, enough to relieve the pin from an offset which is formed in the upper end of the slots in the said clip.

When the pin is relieved from this offset, the bar E, tines F, and tine D, fall the length of the slot in the clip. The bar B remaining stationary, the teeth c c of course draw into the tine D, when said tine falls.

J represents a cross-bar, which extends across the fork, from one of the tines F to the other. This cross-bar falls with the tines, and assists in detaching the hay from the fork, and also serves as a brace and support to the two side tines F F.

This invention is intended as an improvement upon my patent of March 10, 1868.

Having thus fully described my invention, what I claim as new, and desire to secure by Letters Patent, is—

The arrangement of the cross-bar J with the tines F F and D, the clip A, and the bar B, provided with teeth c c, constructed and used as and for the purpose herein set forth.

In testimony that I claim the foregoing, I have hereunto set my hand, this 3d day of April, 1868.

SAMUEL PAGE.

Witnesses:
JOSEPH LEITER,
PETER BURRIS.